UNITED STATES PATENT OFFICE.

RALPH H. PAGE, OF DETROIT, MICHIGAN.

ORGANIC PEROXID.

SPECIFICATION forming part of Letters Patent No. 717,016, dated December 30, 1902.

Application filed January 10, 1902. Serial No. 89,226. (Specimens.)

*To all whom it may concern:*

Be it known that I, RALPH H. PAGE, a citizen of the United States, residing at Detroit, in the county of Wayne and State of Michigan, have invented certain new and useful Improvements in Organic Peroxid, of which the following is a specification.

The invention relates to that class of chemical compounds known as "organic peroxids." Included in this class is the compound benzoyl-acetyl-peroxid $C_6H_5COOOCOCH_3$, which, so far as I am aware, has been heretofore produced by others only in an experimental way and is but slightly known in the art as a "crystalline body." I am unaware that any attempt has been made to form an aqueous solution of this body, and, in fact, the compound as such is almost insoluble in water.

My experiments have led to the discovery that benzoyl-acetyl-peroxid when placed in water undergoes a reaction, in which the original compound is split up into several separate bodies, as follows:

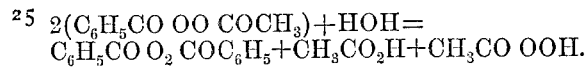
$$2(C_6H_5CO\ OO\ COCH_3) + HOH = C_6H_5CO\ O_2\ COC_6H_5 + CH_3CO_2H + CH_3CO\ OOH.$$

From the above it will be seen that three separate compounds are formed as the result of the reaction—one,

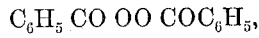
$$C_6H_5\ CO\ OO\ COC_6H_5,$$

or dibenzoyl peroxid, which forms a precipitate, a second,

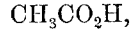
$$CH_3CO_2H,$$

or acetic acid, which remains in solution, and a third body,

$$CH_3CO\ OOH,$$

also in solution, which may be designated as "acetyl hydrogen peroxid." The latter is a compound which I believe to be absolutely new in the art and one having remarkable antiseptic properties. Thus far in my experiments I have not succeeded in isolating it from the acetic acid which is formed in the same solution, and it is doubtful whether this may be successfully accomplished, as any of the ordinary methods employed for this purpose would result in still further breaking down the compound. Its existence in the solution in the form above given has, however, been demonstrated beyond question.

I have also discovered that acetyl hydrogen peroxid can be produced by the hydrolysis of diacetyl peroxid $CH_3COOOCOCH_3$. On account of the highly explosive nature of this latter substance it is unsuitable for use as a substitute for benzoyl-acetyl-peroxid; but its experimental use has demonstrated that organic peroxids other than the benzoyl-acetyl-peroxid may be used as the primary material. It is probable that any organic peroxid containing the acetyl group might be employed in place of the benzoyl-acetyl-peroxid.

Acetyl hydrogen peroxid may be considered as a derivative of ordinary hydrogen peroxid HOOH, in which one hydrogen atom has been replaced by the acetyl group or radical $CH_3CO$. It is a compound having an intense germicidal action. It is colorless, very soluble in water, decomposes on heating above 70° centigrade, changing into acetic acid, gradually decomposes, and becomes inactive toward germs on prolonged standing. It is, however, a comparatively stable compound and will remain in solution unchanged for many weeks. It has a rather sharp characteristic odor and taste and in strong solution—*e. g.*, stronger than one to five thousand—gives a smarting sensation on inflamed tissue, although healthy tissue is unaffected by solution of one to one thousand or even stronger. It does not liberate oxygen on mixing with blood or on contact with mucous matter, as does hydrogen peroxid, though it reacts much more rapidly on blood than hydrogen peroxid.

Although acetyl hydrogen peroxid has an intense germicidal action, it is of a non-poisonous nature, so that it may be administered internally with perfect safety. For example, in typhoid fever the patient may be given to drink a water solution of acetyl hydrogen peroxid without restriction as to quantity. It may be also used for any purpose for which germicides are applicable.

In carrying out the process of making the compound a certain amount of the organic peroxid—for example, benzoyl-acetyl-peroxid in crystalline form—is placed in water at a temperature of about 40° centigrade and in the proportion of one to one thousand or less. If the vessel is then shaken for two or three minutes, a perfectly clear solution will result. In the course of a minute or two a cloudiness will appear in the solution, which rapidly increases until in fifteen or twenty minutes a white percipitate falls out of solution, leaving the liquid clear. This precipitate is the dibenzoyl peroxid, while the clear solution contains the acetyl hydrogen peroxid and acetic acid, as before stated.

What I claim as my invention is—

1. The herein-described antiseptic compound containing an hydrolized acetyl peroxid, which is colorless, is soluble in water, slowly decomposes in aqueous solution and more rapidly in the presence of caustic alkali changing with loss of oxygen into acetic acid, has a penetrating odor resembling that of hypochlorous acid and may be expressed by the formula $CH_3COOOH$.

2. The herein-described antiseptic compound consisting of a solution formed by dissolving in water an organic peroxid containing the acetyl group and thereby hydrolizing the same, which solution is colorless, has a penetrating odor resembling that of hypochlorous acid and a rather sharp characteristic taste, slowly decomposes with loss of oxygen changing into acetic acid, decomposes more rapidly in the presence of caustic alkali and has an intense germicidal action.

In testimony whereof I affix my signature in presence of two witnesses.

RALPH H. PAGE.

Witnesses:
M. B. O'DOGHERTY,
H. C. SMITH.